United States Patent Office 2,860,482
Patented Nov. 18, 1958

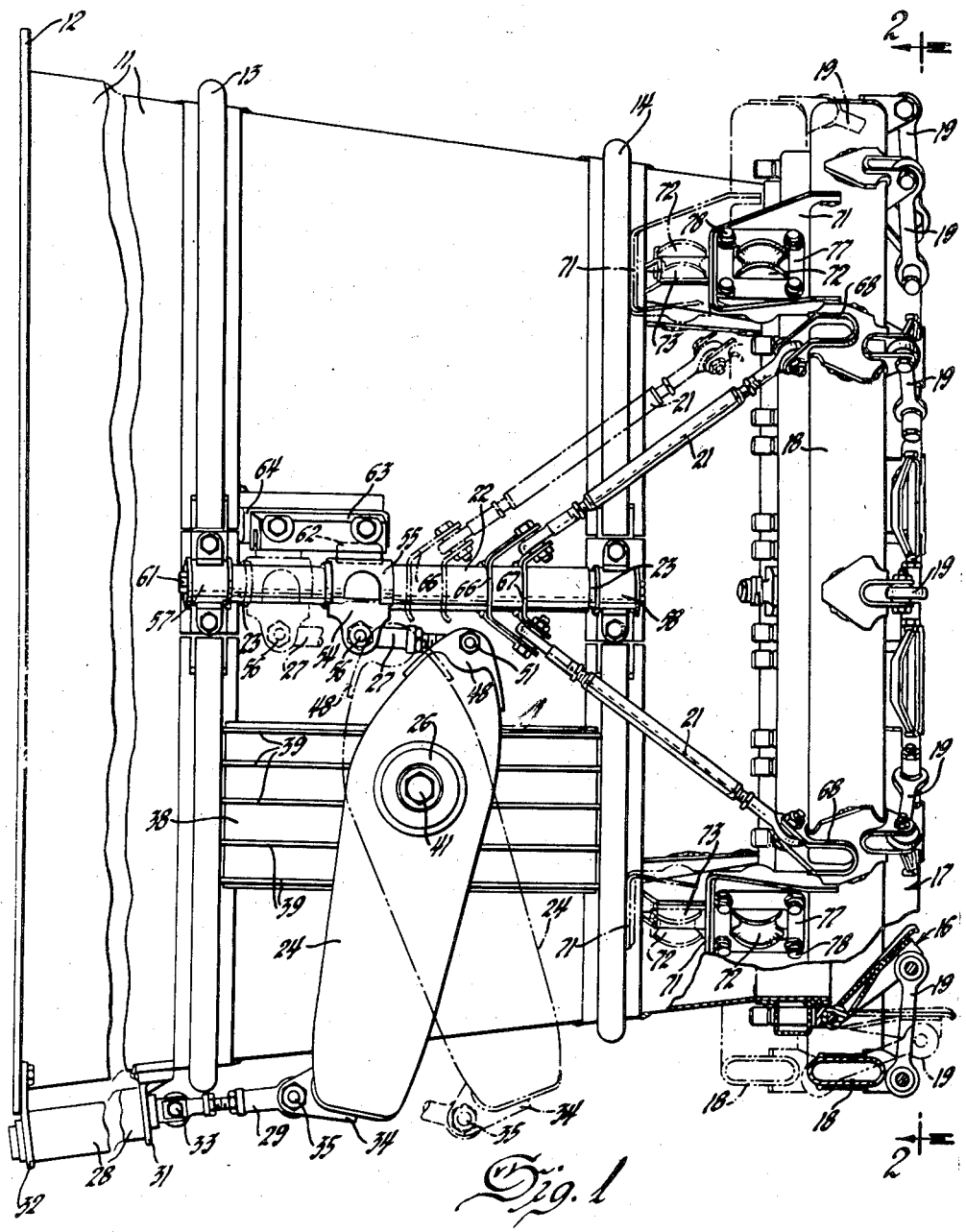

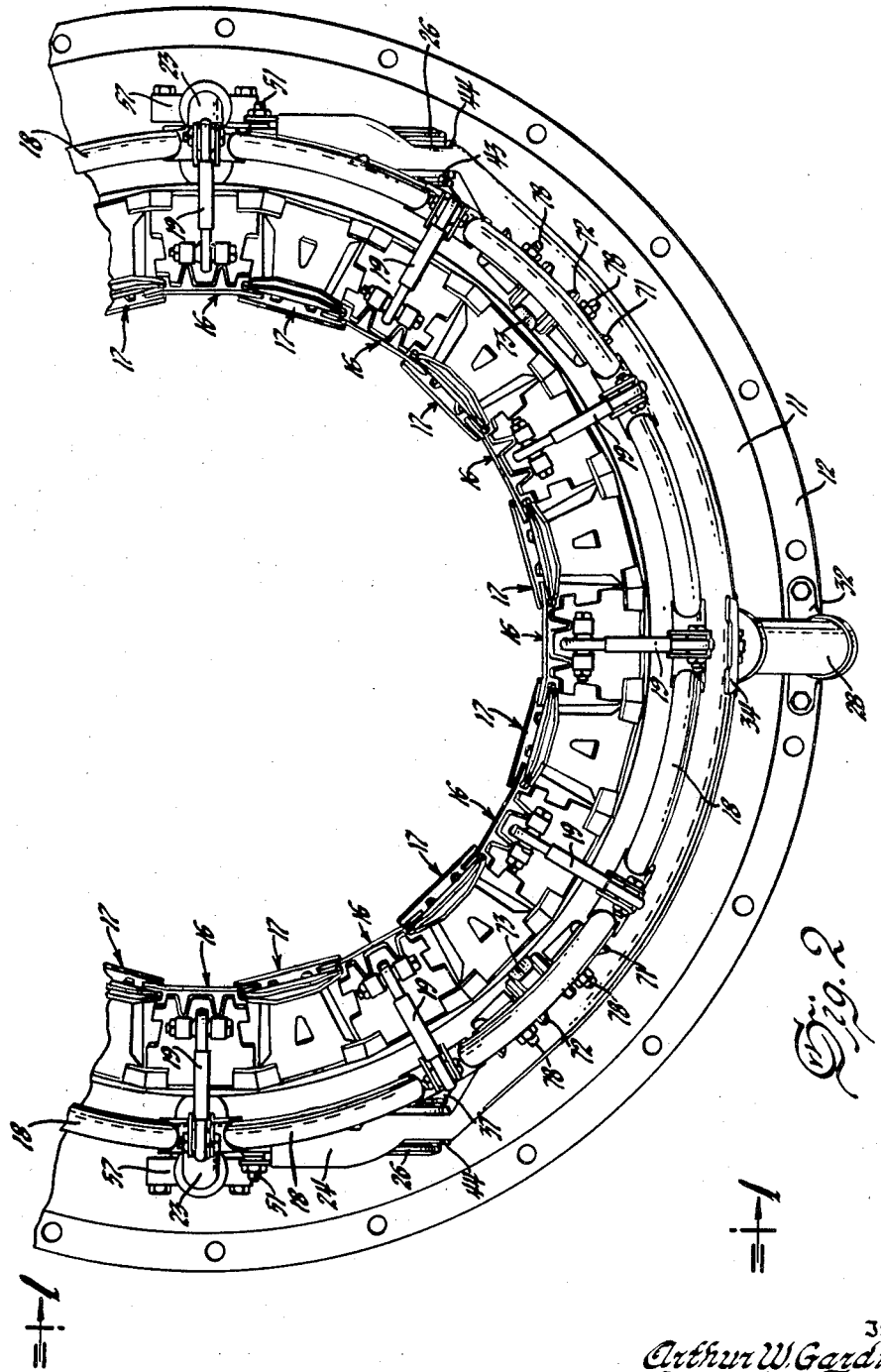

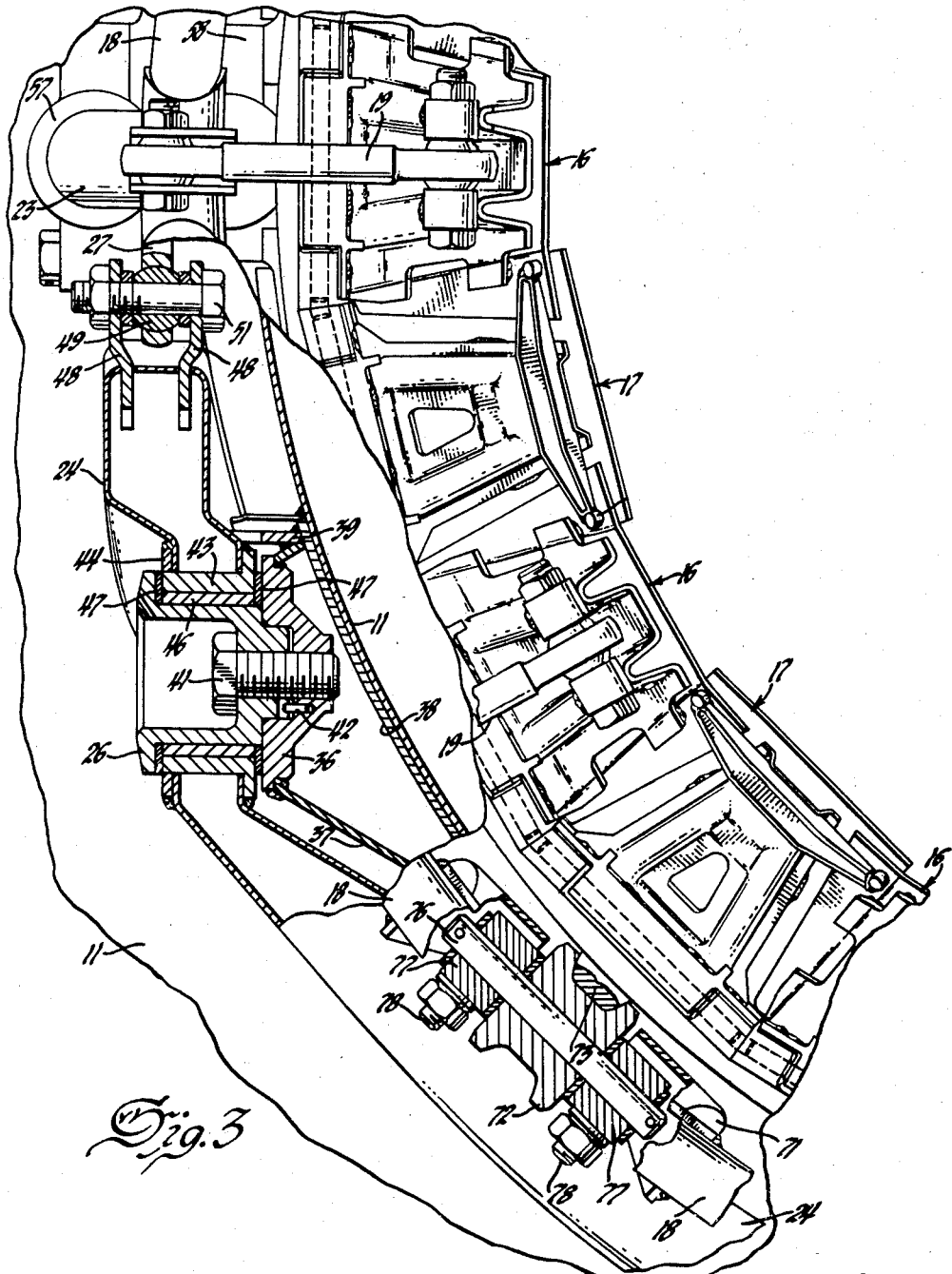

2,860,482

VARIABLE NOZZLE ACTUATING MECHANISM

Arthur W. Gardiner and George M. Ferry, Indianapolis, Ind., assignors to General Motors Corporation, Detroit, Mich., a corporation of Delaware Application January 18, 1951, Serial No. 206,624

5 Claims. (Cl. 60—35.6)

This invention relates primarily to variable propulsion nozzles for use in jet propulsion engines, and more particularly to an actuating means by which the area of such a nozzle may be controlled.

The invention is particularly adapted for use with a variable nozzle disclosed and claimed in an application of Arthur W. Gardiner entitled "Multiflap Variable Nozzle," Serial No. 205,773 filed January 12, 1951, and is described herein in connection with the nozzle disclosed in the Gardiner application for purposes of illustration. It will be understood, however, that the invention and features thereof may be employed in various mechanisms, as will be clearer from the succeeding description.

On account of the relatively large size of jet propulsion nozzles and the substantial gas pressures, considerable force is required for actuation of variable nozzles of certain types. Because of the need for conservation of weight and because of the high temperature of the turbine exhaust gases, the design of exhaust systems for jet propulsion engines presents difficult problems, particularly when it is desired to provide a variable outlet nozzle.

Our invention is directed to an operating mechanism for a variable nozzle which is light in weight but substantial, which may be operated by a single hydraulic cylinder or other actuator, which is adapted to provide for accurate movement of the variable nozzle mechanism, and which does not impose undesirably high stresses on the structure of the exhaust duct.

The principal objects of the invention are to improve variable jet propulsion nozzles and to provide an improved operating mechanism for such devices and for other devices presenting similar problems of actuation. The advantages of the invention will be apparent to those skilled in the art from the detailed description herein of the preferred embodiment.

Referring to the drawings: Figure 1 is a longitudinal elevation of a gas turbine engine tail pipe with a variable nozzle mechanism including the actuator of the invention; Figure 2 is a partial elevation view of the exhaust end thereof; and Figure 3 is a view of a portion of Figure 2 with parts cut away.

The apparatus of the invention is illustrated in Figure 1 in combination with the tail pipe 11 of a jet propulsion engine, which tail pipe, as is well known, discharges the exhaust from the jet engine to atmosphere to provide the propulsive jet. The engine as such is not illustrated, since the invention may be applied to engines of various types, the structure of such engines is well known, and the invention may be understood without reference to the structure of the engine which generates the gas stream. The tail pipe 11 is ordinarily circular in section, may taper as shown, and may be provided with a bolting flange 12 by which the assembly of the invention is coupled to the engine. Stiffening rings 13 and 14 are preferably welded to the tail pipe.

By way of introduction to the detailed description of the structure shown, it may be pointed out that the area of the outlet from the tail pipe 11 is varied by the movement of a number of plates or flaps, preferably twenty-four, disposed in a ring at the outlet of the tail pipe. The flaps are forced inwardly to constrict the jet opening. Alternate flaps 16 are master flaps which are coupled to a mechanical operating mechanism; the intermediate or follower flaps 17 are actuated by the immediately adjacent master flaps. All the flaps are actuated concurrently by a ring 18 encircling the tail pipe and guided for reciprocation axially thereof. The ring 18 is coupled to the master flaps by links 19. Four tie rods 21 are coupled to the ring. Each pair of tie rods 21 is connected to a coupling member 22 which reciprocates on a guide 23 mounted on the tail pipe. An approximately semicircular yoke 24 rotatable about two pivots 26 extending from the tail pipe structure is connected to the coupling members by links 27. The yoke 24 is rotated by a hydraulic cylinder 28 mounted on the tail pipe and connected to the yoke by a link 29.

Certain advantages of the invention will be apparent from the foregoing outline of the structure, but many other important advantages will become clearer in the course of the detailed description.

The cylinder 28 may be any suitable commercial hydraulic cylinder, or could be a pneumatic cylinder or other actuating means, although hydraulic operation is preferred. The cylinder may be mounted on the tail pipe in any suitable manner, as by a bracket 31 welded to the tail pipe and a bracket 32 bolted to flange 12. The piston rod of the cylinder may have a clevis end which is coupled by a pin 33 to the link 29, which may be a conventional link with eye fittings at each end and with provision for adjustment of the length of the link. The link 29 is coupled to a bracket 34 welded to the yoke 24 by a pin or bolt 35.

The yoke 24 (Figs. 1, 2, and 3) is generally semicircular in form and is of light tubular construction, as will be most clearly apparent from Figure 3. The yoke 24 may be formed from sheet metal by conventional methods. The yoke rotates about an axis defined by two pivot members 26, the structure of which is shown most clearly in Figure 3. Each pivot is a flanged cup-shaped member which is piloted in a disk 36 welded to a generally conical sheet metal boss 37 fixed to the tail pipe 11. The support 37 is welded to a plate 38 (Figs. 1 and 3) extending between the stiffening rings 13 and 14 and provided with ribs 39. This plate 38, which is welded to the tail pipe, provides additional strength and distributes the load due to the reaction of the yoke 24 on the pivot 26. The pivot 26 is piloted in the disk 36, is secured therein by a cap screw 41, and is held against rotation by a key 42. The yoke 24 is mounted for rotation on the pivot 26 by a bearing assembly comprising a flanged sleeve 43 welded to the yoke, a ring 44 welded to the outer face of the yoke, a bushing 46 fitted in the sleeve 43 and thrust washers 47. In assembling the apparatus, the yoke is put in position and the pivot members 26 are then mounted.

Ears 48 of relatively heavy gauge metal are fixed to the upper ends of the yoke 24 to provide clevis fittings. The link 27 which connects the yoke to the coupling member 22 is provided with a ball joint end connection arrangement 49, which may be of standard commerical type, and is mounted between the ears 48 by a bolt 51. The forward end of the link 27 is coupled to a bifurcated bracket 54 extending from a sleeve 55 mounted on and fixed to the tubular coupling member 22 by a bolt 56, the structure being similar to that at the rear end of the link, illustrated in Figure 3. The member 22 slides on a tubular guide 23 (Fig. 1) extending between brackets 57 and 58 bolted to the tail pipe 11 over the ribs 13 and 14. The brackets 57 and 58 may be counterbored to receive the tube 23, which is slid into place in the brackets and may be retained by cap screws 61 at each end, the cap screws being threaded into plugs fixed in the ends of the tube. A blade 62 extending upwardly from the sleeve 54 slides in a groove in a guide 63 bolted to a U-shaped bracket 64 welded to the tail pipe 11. The blade 62 serves to prevent rotation of the coupling member 22 about its axis. The coupling member 22 has welded thereon plates 66 and 67 which couple the forward end of the links 21 to the member 22. This connection likewise is a conventional ball joint arrangement, similar to the joint 49, providing angular freedom of movement for the links 21.

The links 21 diverge outwardly from each other at about a sixty degree angle and are coupled by a ball joint and pin arrangement to brackets 68 welded to the ring 18. The links 21 include conventional means for adjustment of the lengths thereof so that the ring 18 may be accurately adjusted to conform to a plane perpendicular to the axis of the tail pipe.

The ring 18 is a flattened tubular ring encircling the tail pipe 11 at the outlet thereof. Projecting forward from the ring and welded thereto are four brackets 71 of channel section spaced 90 degrees apart around the ring. A flanged roller 72 mounted on each bracket 71 traverses a rail 73 fixed on the tail pipe 11. The shaft 76 of the roller 72 is mounted in a rectangular frame 77 fixed to the bracket 71 by four bolts 78.

The details of the structure of the flaps 16 and 17, the mounting of the flaps, and the arrangement by which they are actuated from the ring 18 are not material to our invention or essential to an understanding thereof and, therefore, will not be described herein. They are described fully in the abovementioned Gardiner application. As will be apparent from Figure 1, with the ring 18 in the position shown in full lines, the links 19 hold the master flaps in position to reduce the nozzle area. If the ring 18 is moved forwardly, the flaps 16 are moved outwardly by the links 19 to open the nozzle. The intermediate flaps 17 are coupled to the flaps 16 for movement therewith.

Although the operation of the mechanism will no doubt be clear from the foregoing, it may be reviewed briefly. Assuming that the flaps are in the open position, the piston of the cylinder 28 will be at its rearward limit of travel. Fluid under pressure may be admitted to the rear end of the cylinder by any standard reversing valve (not shown) which vents the forward end of the cylinder. The piston is thus moved forward. The yoke 24 is rotated clockwise, as viewed in Figure 1, and the coupling member 22 is forced rearwardly. This motion is transmitted by the rods 21 to the ring 18 which forces the valve plates 16 inwardly by means of the links 19. The plates 17 are forced inwardly by the plates 16. To open the nozzle, the action is reversed. Preferably, a double-acting cylinder and an appropriate control valve are employed so that the jet nozzle may be opened by power, particularly in view of the fact that the links 19 are substantially radial when the nozzle is closed. An actuator mechanism of a servo type which will maintain the flaps in any position set by a primary control device is preferably provided. This may be accomplished by a servo valve (not shown) controlling the cylinder 28.

It will be apparent to those skilled in the art that the structure described is particularly adapted to achieve the objects of the invention and that many advantages are inherent in the invention.

The detailed description of the preferred embodiment is not to be considered as limiting or restricting the scope of the invention, as many modifications thereof may be made by those skilled in the art within the scope of the invention.

We claim:

1. An operating mechanism comprising, in combination, a body, a control ring encircling the body and mounted for reciprocation axially of the ring, two coupling members mounted for reciprocation axially of the ring at opposite sides of the body, two links connecting each coupling member to spaced points on the ring, a yoke lever pivoted on the body, means connecting the yoke lever to the coupling members for concurrent reciprocation thereof, and means for moving the yoke lever.

2. An operating mechanism comprising, in combination, a tubular shell, a control ring encircling the shell and mounted for reciprocation axially thereof, two coupling members mounted for reciprocation axially of the shell at opposite sides thereof, two adjustable links connecting each coupling member to spaced points on the ring, a yoke lever pivoted on the shell, means connecting the yoke lever to the coupling members for concurrent reciprocation thereof, and means for moving the yoke lever.

3. An operating mechanism comprising, in combination, a tubular shell, a control ring encircling the shell and mounted for reciprocation axially thereof, two coupling members mounted for reciprocation axially of the shell at opposite sides thereof, two adjustable links connecting each coupling member to spaced points on the ring, a yoke lever pivoted on the shell, means connecting the ends of the yoke lever to the coupling members for concurrent reciprocation thereof, and power means for moving the yoke lever coupled to the yoke lever at a point intermediate the ends thereof.

4. An operating mechanism for a variable jet nozzle or the like comprising, in combination, a tubular shell, an actuator mounted thereon including a part movable axially of the shell, pivot means defining an axis of rotation disposed transversely of the shell, a yoke rotatably mounted on the pivot means, means coupling the yoke to the said part for rotation thereby, a guide extending axially of the shell at each side thereof, a coupling member slidable on each guide, means connecting the coupling members to the yoke, a ring disposed transversely of the shell and guided for movement axially of the shell, and two links connecting each coupling member to spaced points on the ring.

5. An operating mechanism for a variable jet nozzle or the like comprising, in combination, a tubular shell, an actuator mounted thereon including a part movable axially of the shell, pivot means defining an axis of rotation disposed transversely of the shell, a yoke rotatably mounted on the pivot means, means coupling the yoke to the said part for rotation thereby, a guide extending axially of the shell at each side thereof, a coupling member slidable on each guide, means connecting the coupling members to the yoke, a ring disposed transversely of the shell and guided for movement axially of the shell, and two links connecting each coupling member to spaced points on the ring, the links being adjustable in length.

References Cited in the file of this patent

UNITED STATES PATENTS 2,396,598    Neumann et al. _____ Mar. 12, 1946

FOREIGN PATENTS 529,723    Great Britain _____ Nov. 27, 1940